United States Patent
Raasch et al.

[11] Patent Number: 5,956,877
[45] Date of Patent: Sep. 28, 1999

[54] COLLECTIBLE COMMEMORATIVE DISPLAY TICKET CONTAINING FILM CLIP

[75] Inventors: Kenneth E. Raasch, Los Gatos; Suzanne J. Nason, Saratoga, both of Calif.; Danny C. Bartlett, Cuyahoga Falls; Philip M. Zavracky, Stow, both of Ohio

[73] Assignee: Kenneth E Raasch, Los Gatos, Calif.

[21] Appl. No.: 08/857,077

[22] Filed: May 14, 1997

Related U.S. Application Data

[63] Continuation of application No. 08/398,723, Mar. 6, 1995, abandoned.

[51] Int. Cl.⁶ ................................................ G09F 1/12
[52] U.S. Cl. ............................. 40/702; 40/704; 40/705; 40/124.11; 40/774
[58] Field of Search .............................. 40/701, 702, 703, 40/704, 705, 706, 709, 124.11, 299.01, 661.08, 672, 774, 776, 779; 353/120

[56] References Cited

U.S. PATENT DOCUMENTS

| | | | |
|---|---|---|---|
| 2,385,541 | 9/1945 | Rinn | 40/705 |
| 2,639,254 | 5/1953 | Smith | 40/705 X |
| 2,690,022 | 9/1954 | Sacre | 40/702 X |
| 2,896,351 | 7/1959 | Johnson | 40/702 |
| 3,235,991 | 2/1966 | Harper et al. | 40/705 |
| 3,297,398 | 1/1967 | Donofrio | 353/120 |
| 3,466,126 | 9/1969 | Sakamoto . | |
| 3,466,780 | 9/1969 | Reid . | |
| 4,014,121 | 3/1977 | Moser . | |
| 4,250,641 | 2/1981 | Thompson . | |
| 4,440,298 | 4/1984 | Knight . | |
| 4,607,442 | 8/1986 | Desmarais . | |
| 4,890,402 | 1/1990 | Carroll . | |
| 5,000,319 | 3/1991 | Mermelstein | 40/704 X |
| 5,161,827 | 11/1992 | Grosso | 40/661 X |
| 5,269,084 | 12/1993 | Best et al. . | |
| 5,287,641 | 2/1994 | Showers . | |
| 5,362,540 | 11/1994 | Keng | 40/661 X |
| 5,429,700 | 7/1995 | Hudson | 70/703 X |

FOREIGN PATENT DOCUMENTS 115536  12/1945  Sweden .............................. 40/159.2

*Primary Examiner*—Brian K. Green
*Attorney, Agent, or Firm*—Jacques M. Dulin; Heller Ehrman White & McAuliffe

[57] ABSTRACT

Collectible, rectangular ticket-type display device having a window in which is mounted a transparency type film frame or multi-frame clip for see-through type viewing. The display device preferably includes security and/or authentication indicia, and is fabricated from archival-quality materials. The ticket is formed from a single folded sheet of heavy paper or plastic material and scored along one edge for a fold to define a front and back panel. The film frame or clip is secured in an envelope or packet of non-bleed, non-yellowing transparent polyester plastic which is mounted to one inner face of the ticket panels. Preferably the ticket window is of sufficient size to exhibit the sprocket holes of the film frame or clip for authenticity. The transparency images may be of a motion picture or performance event such as a concert, sporting or historical event, and may be reproduced from a film positive or negative, or from video tape. Methods for manufacture of the collectible ticket and the archival envelope are disclosed. The collectible ticket may be retained for archival purposes or for display in an album having special plastic pages having a plurality of pocket-type sleeves for retainingly engaging the tickets. A transportable sleeve is also disclosed.

4 Claims, 5 Drawing Sheets

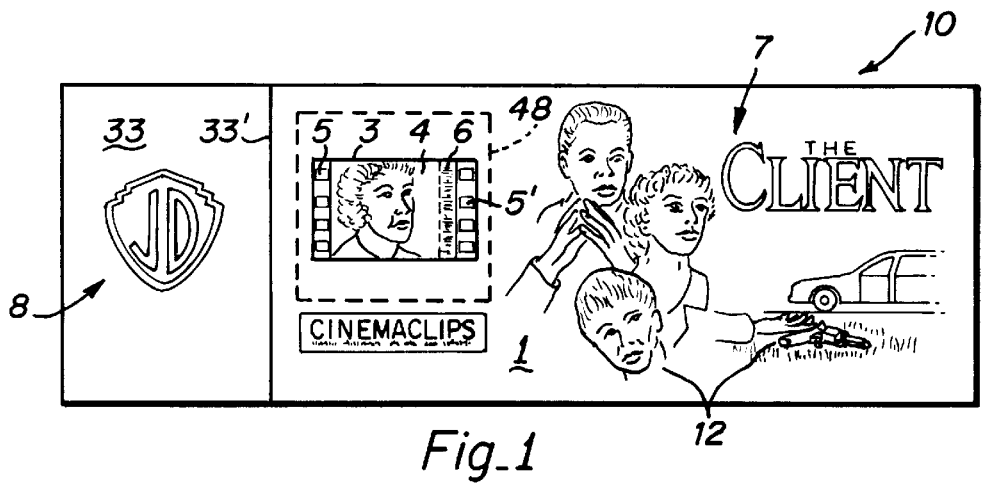
Fig_1
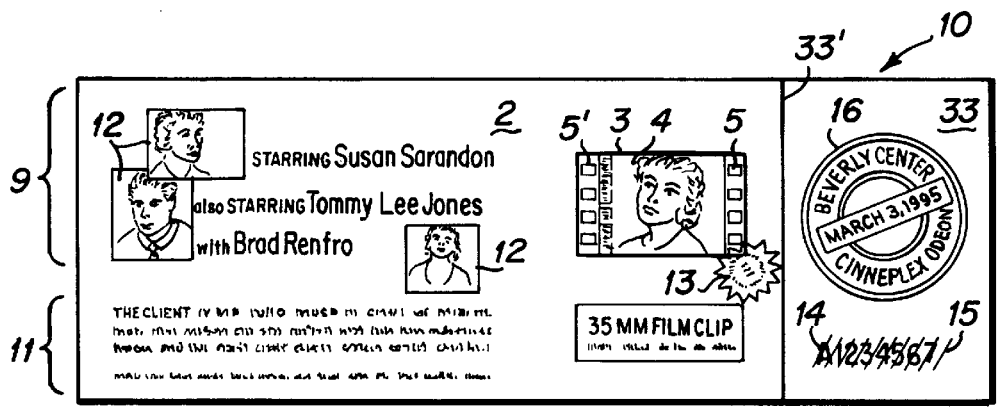
Fig_2
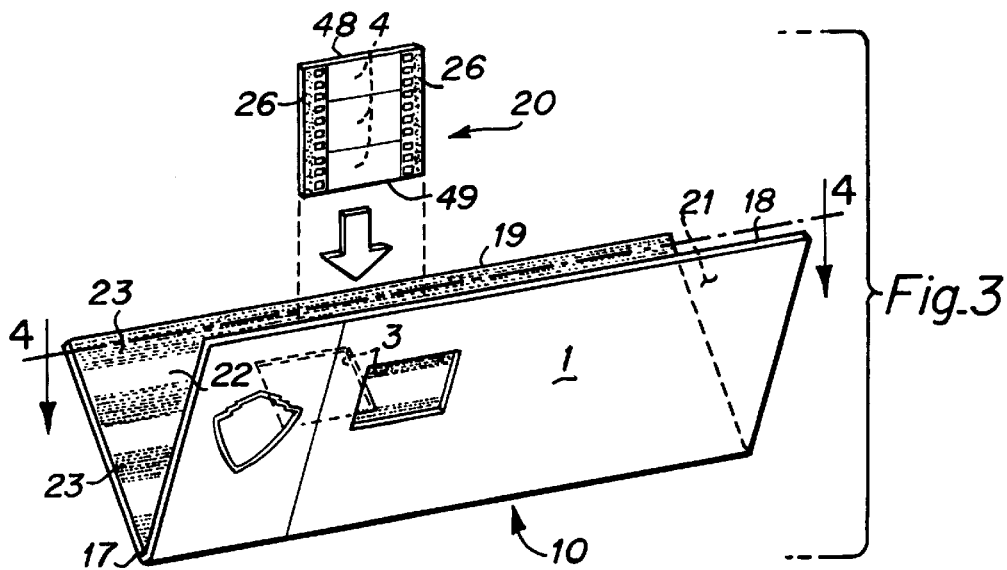
Fig_3

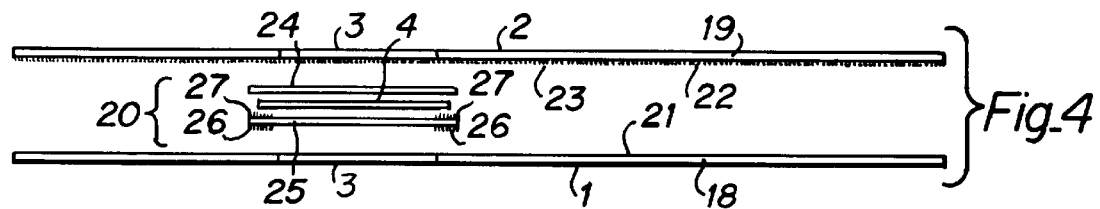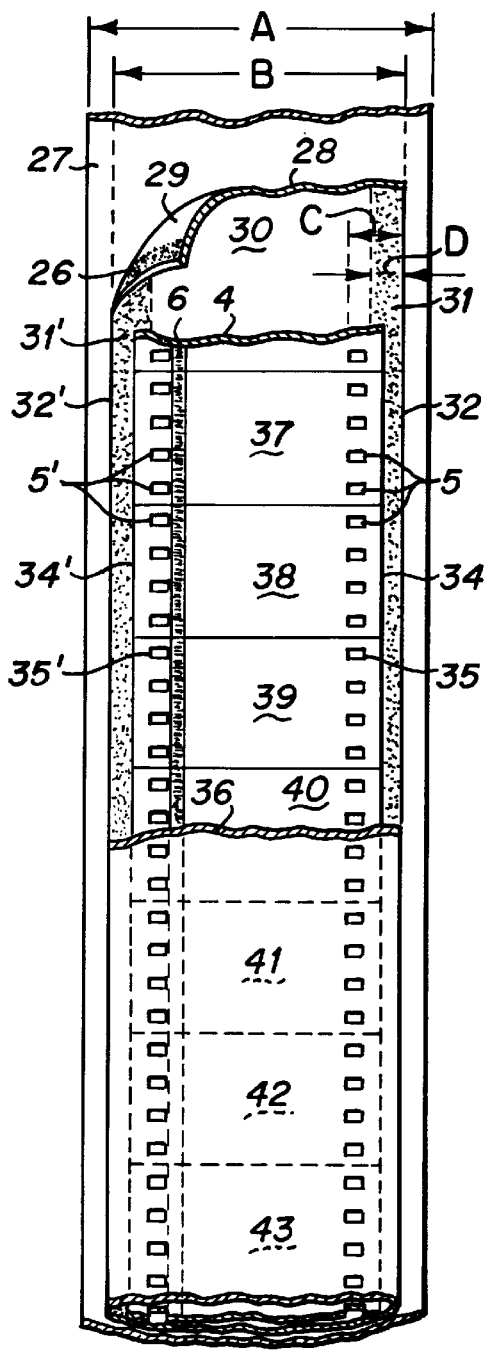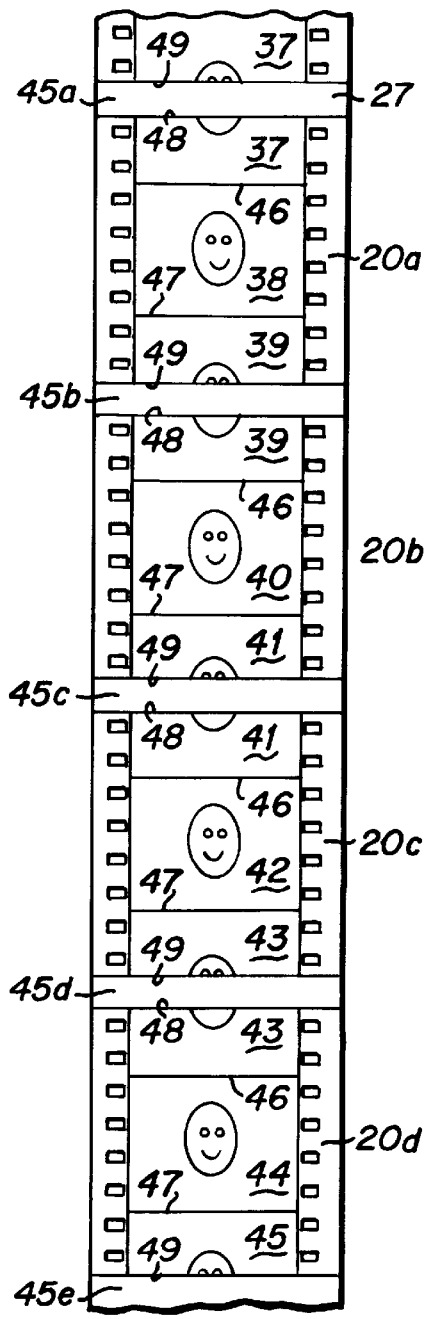
Fig. 4
Fig. 5
Fig. 6

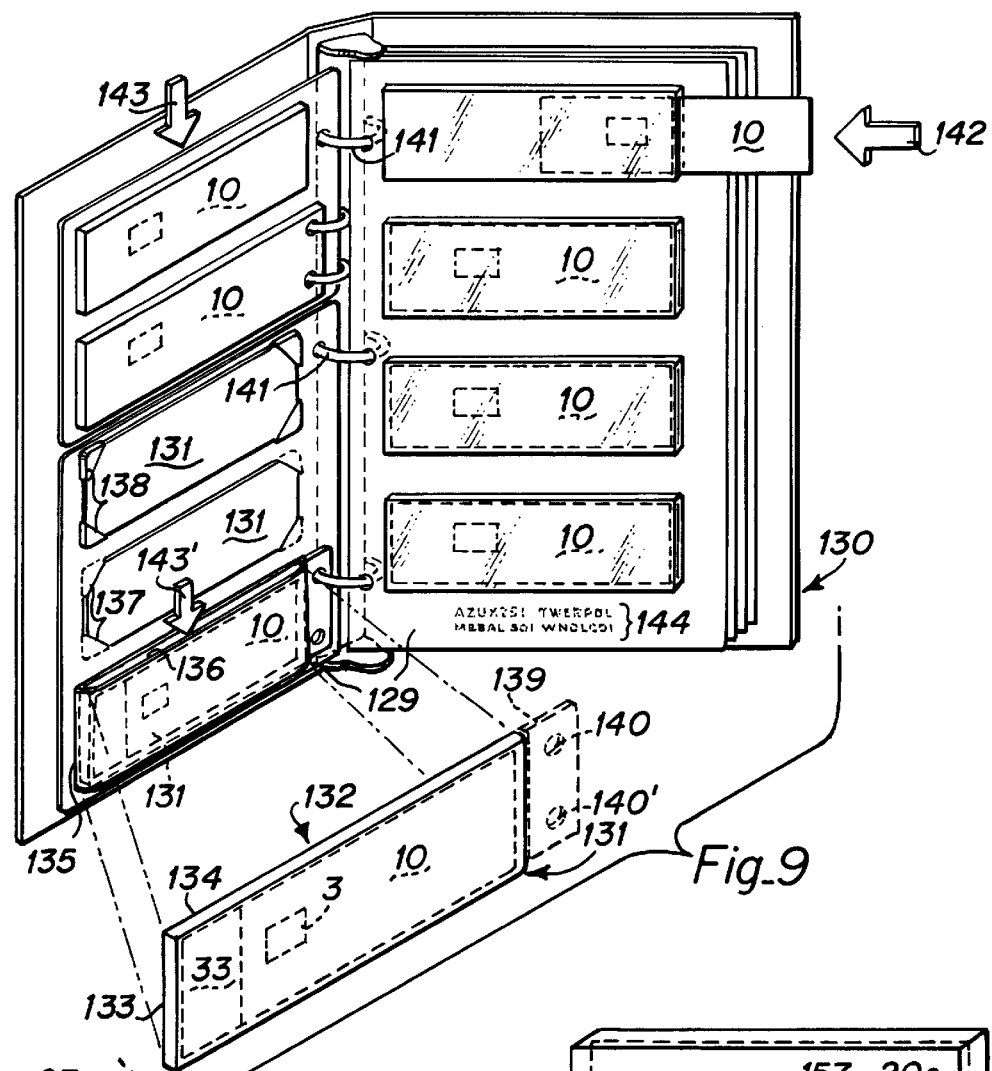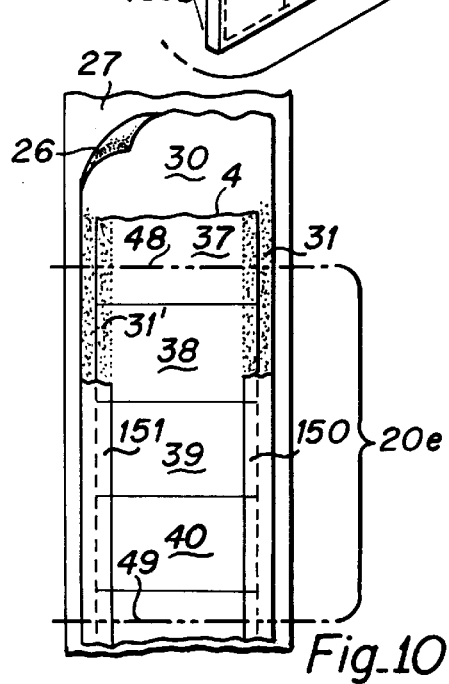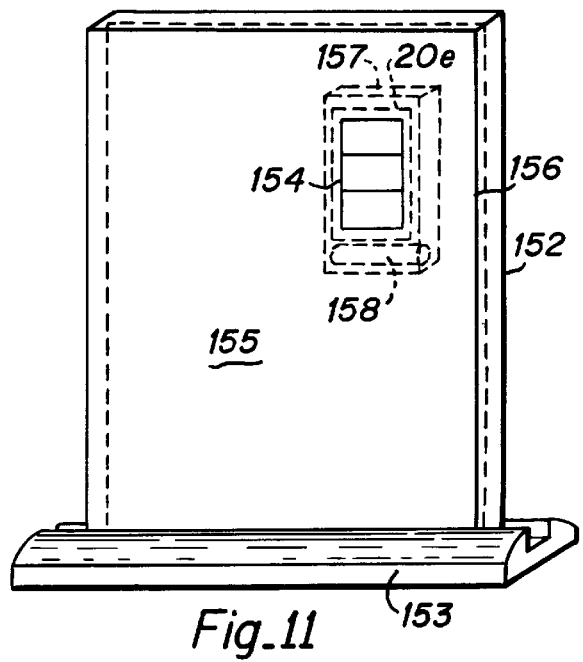

COLLECTIBLE COMMEMORATIVE DISPLAY TICKET CONTAINING FILM CLIP

This application is a continuation of application Ser. No. 08/398,723, filed on Mar. 6, 1995, now abandoned.

FIELD

This invention relates to collectible display devices, and more particularly to a multi-layer ticket-type device having a window in which a film frame or multi-frame clip transparency is mounted for see-through display. The ticket device is preferably rectangular and includes selected security or authentication indicia, and information relating to the image on the frame. The ticket is preferably made of archival quality sheet material comprising front and back ticket panels, and a packet formed of non-bleeding, non-yellowing, UV-resistant plastic over-layers between which the film frame or clip is secured. In turn, the packet is mounted between the ticket panels so the image is visible through the window.

BACKGROUND

There are a wide variety of display devices for memorabilia and collectibles, including stands for trading cards, various types of albums for photographs, trading stamps and slides, wall plaques, plate hangers and the like. However, there has been little attention directed to devices for display of authentic film frames or multi-frame film clips. One such is a large, rectangular plastic, shallow-depth case with upstanding side walls and a recess for a cover into which is inserted 8"×10" or 5"×7" sheets of paper with a cutout to display a multiple-frame clip from a moving picture mounted between the sheets. This plastic "jewelcase" is mounted on a stand so that the plastic case is upstanding and inclined for viewing. The plastic case and stand is generally for table-top or curio cabinet display, and typically includes a print picture and text regarding the film clip displayed therein. Such a device is offered by Lightpost Group, Inc. of San Jose, Calif.

There are a number of patents which disclose a variety of slide mounts, including paper and plastic slide mounts. For example, Reid U.S. Pat. No. 3,466,780 shows a typical paper photographic slide mount in which a single 35 millimeter transparency frame is secured between heavy layers of paperboard. The patent is particularly directed to the continuous die cutting of a single strip of paperboard, with either diagonal or transversely cut flaps which form one of the sides. This permits insertion of the 35 millimeter transparency frame, after which the flaps of the second side are folded over to secure the slide transparency in place. The window or aperture through which the slide projector light is projected to display the slide image is sized to hide the sprocket hole strips on each side of the slide transparency.

Desmarais, et al. U.S. Pat. No. 4,607,442 and Thompson U.S. Pat. No. 4,250,641 show more complex plastic slide frame holders. The former has special tabs engaging the sprocket holes to secure the transparency in place. The latter shows the use of a bowed film strip as a pusher element to insert a precut film frame in a preclosed plastic slide mount through a slot in the side of the mount. Sakamoto U.S. Pat. No. 3,466,126 shows a slide-holding frame that holds a straight row of overlapping slides (in paper mounts), called a filing plate, for use in a special projector.

Other patents show a number of other devices for permanent or removable display of photographs, that is, photographic prints viewable in reflected light, as compared to viewing the slide as a transparency projection on a screen. For example, Carroll U.S. Pat. No. 4,890,402 shows a generic greeting card with a sheet plastic cover having upper and lower transverse gripping flanges. The user supplies a photograph which is slipped between the transparent cover and the front face of the greeting card. Best, et al. U.S. Pat. No. 5,269,084 shows an apertured card in which a print photograph is secured by adhesive on either the edges or on a backing sheet. Moser U.S. Pat. No. 4,014,121 shows a photo display stand consisting of an image of a person's torso holding the photo in the hands, with two fingers and the thumbs forming tabs to retain the bottom and side edges of the photograph. Knight U.S. Pat. No. 4,440,298 shows a greeting card having an inner transparent pocket for holding a T-Shirt. A round window through the openable front cover permits viewing the print or screened image on the T-Shirt through the window.

Showers U.S. Pat. No. 5,287,641 shows a collectible trading card formed of a blank having a front and back panel folded to provide one unsealed card. The front panel has a direct opening of predetermined size and shape, such as a pentagonal "home plate shape", for baseball card. A clear window panel covers the opening and displays an image printed therein. An image enhancing slidable insert is provided for insertion in the open end of the card. The inner face of the back panel also includes an image printed therein. Thus, when the insert is in place, the window image is enhanced. When the insert is removed, the back panel image shows through. The insert itself may include an image visible through the window.

Accordingly, there is currently not available any device for effective display of a commemorative film clip as part of a commemorative event ticket of an archival nature.

THE INVENTION

Objects

It is an object of this invention to provide a commemorative display device for a commemorative frame or multi-frame film clip of a motion picture or a reproduction of a video event.

It is another object of the invention to provide a combination commemorative ticket of a motion picture, news, historical or sporting event, or a performance event which retains and maintains in an archival manner a film frame or a clip of a scene of that event, along with indicia and information regarding the event as a commemorative, memorabilia or collector's item of an archival quality.

It is another object of the invention to provide a special packet for archival preservation and protection of a film frame or clip, methods for manufacture of the packet, and methods for assembly with window tickets or other sheet-type display items.

It is another object of the invention to provide protective sleeves having provision for removable retention in special albums or binders.

It is another object of this invention to provide an album for a ticket-type commemorative device having a window for see-through display of a single frame or multi-frame clip of film transparency, which album includes transparent, non-bleeding archival quality plastic sheets with pockets formed therein for retaining a plurality of the commemorative ticket display devices.

Still other objects of the invention will be evident from the specification, drawings and claims hereof.

SUMMARY

The invention comprises an archival quality display device in the form of a commemorative ticket, typically rectangular, having a special aperture therein for display of a film frame or multi-frame film clip for see-through viewing of the image on the film. The ticket device also provides means for authentication and security, as well as information relating to the film frame or clip scene or the event to which the film frame or clip scene relates. The film frame or multi-frame clip may be, typically, a clip from a motion picture, or a news, historical, scientific or performance event, such as a sporting event, concert or the like. The image on the transparent film is viewed simply by holding the ticket up to the light for see-through viewing, or it may be placed over a white opaque or reflective background for contrast see-through reflectance viewing. The scene may be, for example, a film reproduction of a video taped event, such as a winning score in a championship event, or the like.

The ticket is preferably a multi-panel sheet of good-to-archival quality heavy paper, generally rectangular in form with an aspect ratio of a typical ticket (longer than wide) with aligned window apertures cut in each of a front and a rear panel. The panels are bonded together and the outside (front and back) faces of the panels contain the printed information, security and/or authentication indicia thereon.

The film frame or multi-frame clip is typically rare, one of a kind, or limited edition reproduction of high quality or high value. It is enclosed in an archival quality, non-bleeding (non-transferring) non-yellowing, U-V resistant transparent plastic film "packet", such as high quality polyester (e.g., Mylar), or other plastic compatible with the film transparency. The plastic overlayers protect the delicate surface of the film during handling to prevent scratching or hand oils contamination of the surface in order to maintain its "mint" or original condition. This "envelope", (or packet) of the commemorative film frame or multi-frame clip within the archival plastic over-layers (also called a "sticker") is then secured by trapping or adhesively mounting the edges thereof between the front and back panels of the ticket oriented, with respect to a window cut in each panel, for see-through viewing. In a preferred embodiment, the window in the ticket is of sufficient size to also display the sprocket holes of the film clip to demonstrate the nature and authenticity of the film frame or multi-frame clip.

The invention also comprises a method for production of the commemorative windowed display ticket of this invention, the production of the film frame or multi-frame clip protective plastic packet, and its securement in the ticket. The invention further comprises a commemorative album with special archival quality transparent pages having sleeve-type pockets therein for holding a plurality of the commemorative ticket display devices of this invention. In another embodiment, a single protective and diffusing plastic layer can be employed for film clip packets for jewelcase type easel display units.

The memorabilia ticket of this invention is preferably produced from either a continuous strip of material which is then cut transversely at each unit length to produce the individual tickets, or the individual ticket blanks can be die cut first, and then folded, assembled and glued. The ticket blank is typically a single sheet of suitable quality heavy paper stock, such as 8–10 point bleached white paperboard stock coated one side, and is preferably of archival quality. The blank is scored down the middle longitudinally so that two, 2½" by 7" inch panels are formed. The front and back exterior surfaces are printed, e.g. by single side printing, preferably before die cutting from a larger blank or separation from a continuous strip. Alternatively, thinner high quality printed glossy stock can be glued to, a heavier ticket stock. In the preferred embodiment, the tickets are produced "multi-up" from sheet stock in a sheet fed press of suitable width. The individual tickets and windows are then die cut and separated from the sheet stock. The two panels are then folded along the longitudinal scoreline to form a V, and the film packet, described in more detail below, is then positioned and glued in place. Glue is then applied to the open interior surface of the V-shaped assembly and the two panels brought together to complete the ticket assembly. The serial number, edition number, or other authenticating indicia may then be applied. Alternately, the serial numbers may be prearranged and press printed at the same time as the face side of the ticket. Typically, the issuing theater stamps the ticket with identifying indicia such as location and date, and may optionally add a serial number.

The film clip packet is produced as follows. A continuous strip or ribbon of high quality, transparent, glossy-surface (polished) polyester film, typically having a thickness of one to five mills is glued to a paper carrier strip. The carrier is heavy kraft paper, siliconized on the glue side to permit release, and has a width on the order of from about 2⅛"–2⅜" to just as wide as the film packet. Then, two spaced strips of adhesive are applied on the upper face of the polyester ribbon extending inwardly from the marginal edges a distance just sufficient to engage the outer edges of the film strip between its outer edges and the outer margins of the sprocket holes. That is, the glue preferably does not extend inwardly of the outer margins of the sprocket holes. A continuous strip of frame images, either alike or in related sequence (e.g. motion picture film footage) is unspooled and carefully laid-down on the polyester ribbon so the glue engages the outer margins, i.e. between the outer edge of the sprocket holes to the outer edge of the film strip. Then a second ribbon of identical polyester film, optionally with glue strips in similar margin locations, is laid in a congruent relationship on to the first poly strip, so that the film strip is edge glued between the two strips of protective polyester film. The adhesive may be any suitable solvent, pressure sensitive or thermal type glue. Then, the three-ply laminate packet is cut transversely to liberate individual frame packets.

In a presently preferred embodiment, every other frame becomes available. That is, the single viewed frame is flanked top and bottom by approximately one-half of the next adjacent preceding and trailing frames, respectively. The transverse cut passes through every other frame. However, it should be understood that in the case of reprints or reproductions, the reprint image may be automatically spaced sufficiently far apart, say one full frame, to provide leading and trailing edges of unexposed or unprinted film. In another approach, individual frames can be sectioned from the film and leading and trailing segments can be spliced to it. However, this splicing needs to be done prior to insertion and lamination between the two protective polyester ribbon strips. In still another embodiment, the film piece may be a single frame, glued to a longer piece of the poly strip so the poly strip extends beyond the top and bottom of the frame for securement to the ticket window.

The resulting film packet may then be adhered as is to one inner face of the ticket with the full frame aligned with the die cut window so that the full frame, including the side sprocket holes, is viewable. In this embodiment, the top and bottom transverse edge of the packet is still open, that is, unsealed. The glue on the inner face of the ticket may serve to seal these edges. In an important alternative embodiment, the transverse top and bottom edges of the packet can be sealed to provide a completely hermetic archival packet. The plastic may be a heat-sealable type, and the packet heat sealed rather than glued.

In another important embodiment, individual frames can be transversely cut and liberated from continuous film. By use of conventional pick and place apparatus, such as a vacuum picker, the individual frames can be positioned on individual rectangular pieces of polyester film and glued or sealed as described above. In this embodiment, the individual rectangles of polyester plastic, also called over-protector sheets, can be made of a single rectangular sheet, folded to form two equal panels so that the fold forms one of the sealed edges. This is termed a "folio", or a "folded leaf." The film is then inserted between the leaves of the folio, and at least the edge opposite the fold is then sealed. If desired, the other two edges, top and bottom edges, may be sealed to form the film packet for insertion in the folded ticket blank to complete the production of the collectible ticket devices of this invention.

In the preferred method, the film is laminated between the poly ribbons mounted on the peel-off carrier strip, and then kiss cut with removal of a ⅛" web between adjacent packets. The ticket is preferably scored on the top so there is a smooth top presentation edge.

BRIEF DESCRIPTION OF DRAWINGS

The invention is illustrated in more detail in the drawings in which:

FIG. 1 is a front elevation isometric view of the commemorative display ticket-type device of this invention with a window aperture through which a film frame or multi-frame clip transparency may be viewed, and which includes security, authentication and descriptive information relating to the frame or clip image;

FIG. 2 is a back elevation view of the ticket of FIG. 1;

FIG. 3 is an exploded isometric view of the commemorative ticket device of the invention illustrating insertion of the film clip packet or sticker between the ticket panels in proper orientation to be viewed through the window;

FIG. 4 is an exploded section view through line 4—4 of FIG. 3 showing the ticket construction and including the archival packet for the film frame or clip;

FIG. 5 shows in plan view the sequence of the multiple layers of the archival film clip packet;

FIG. 6 is a simplified schematic plan view of the film packets mounted in a label matrix arrangement on the carrier strip;

FIG. 9 shows the commemorative ticket device of this invention mounted in an album having archival quality plastic pages with multi-ticket sleeve-type pockets therein for maintaining the commemorative ticket devices in essentially mint condition;

FIG. 10 is an isometric view of another embodiment of an alternative film clip packet of this invention employing a matte diffusing back or lower poly strip; and FIG. 11 is an isometric of the packet of FIG. 10 mounted in an easel-type jewelcase display unit.

DETAILED DESCRIPTION OF THE BEST MODE

Figure 7:
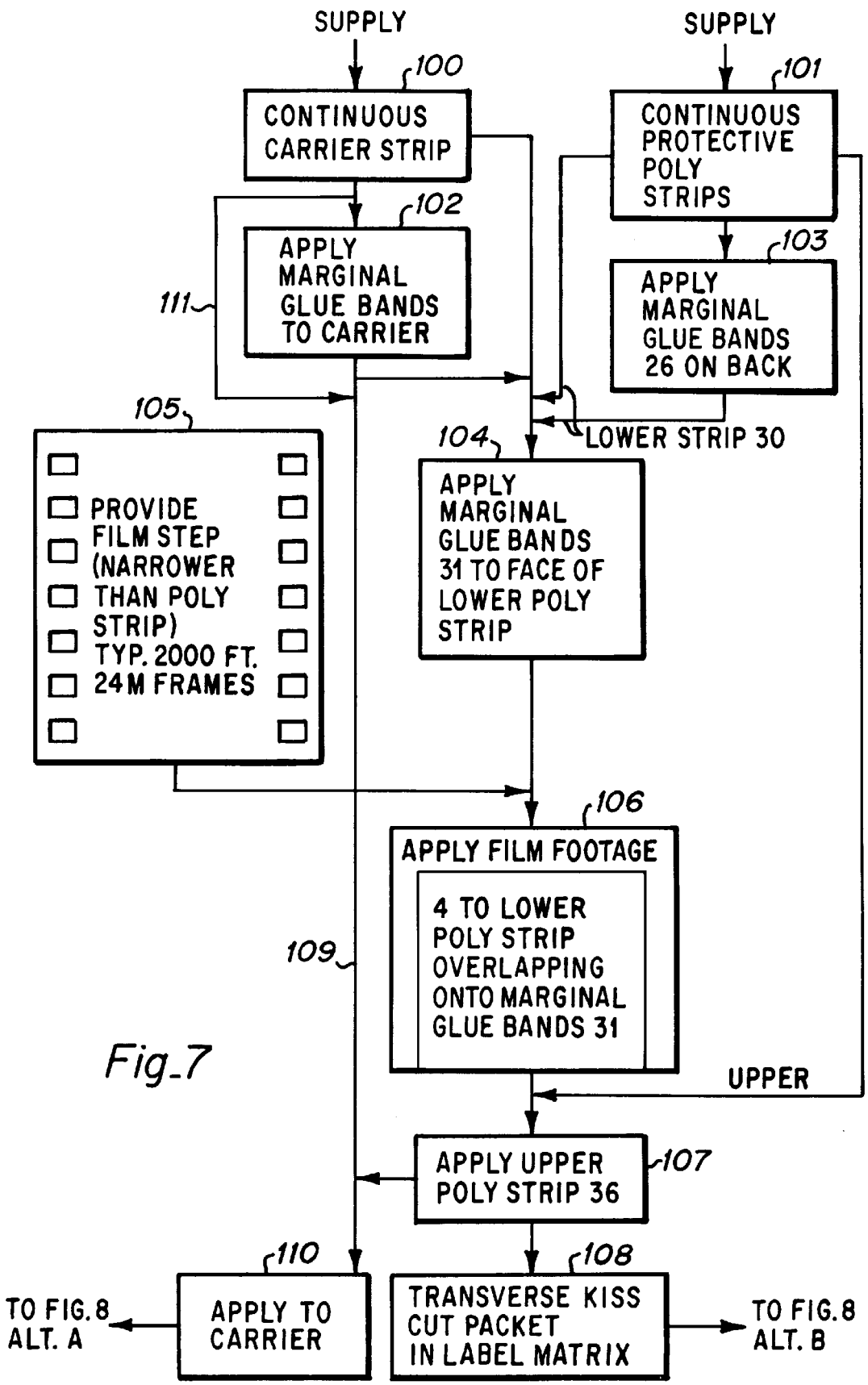
FIG. 7 is a flow sheet of a method of making the film packets of the invention.

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

Considering FIGS. 1 and 2 together, FIG. 1 is an elevation view of the front face 1 of the commemorative ticket 10 of this invention, while FIG. 2 is an elevation view of the back face 2 of the ticket. The ticket has a typical aspect ratio of length to width ranging from about 5:1 to 2:1. A typical ticket is 2½" by 7" in length, and includes a die cut window 3 through which a film frame clip 4 may be viewed. As shown, the marginal sprocket holes 5, 5' and the sound strip or track 6 are visible, both of which assist in identifying the authentic nature of the film clip as being from a motion picture. In addition, the ticket will have related correlating indicia, such as title of the movie 7; trademark logo or other identifier of the film studio 8 in a reserved area 33 defined by contrast printing or line 33'; indicia 9 identifies the stars of the film and optionally the roles they play, and text 11 telling the story of the film and the plot line in as much detail as is determined is appropriate and is easily readable. It should be understood that where the term "film" is referred to, that broadly includes the film, event or other subject of the commemorative ticket. Images of persons or scenes 12 may also be printed on one or more faces of the commemorative ticket.

Preferably, and especially in limited edition commemorative tickets, there are one or more authentication and identifying indicia or other elements. For example, an authentication or genuineness seal 13 may be applied or hot stamped onto one or more ticket face. In FIG. 2 the seal 13 is applied to one corner of the frame window and overlapping thereon to make the film clip tamper-proof. In addition, some other identifying numerical, bar code or other indicia 14 may be employed to identify the particular ticket or the event. As shown in FIG. 2, the serial number "A123456" is employed, but it should be understood that this could well be a limited edition number, such as a "3807/10,000". Also shown is optional "greeking" indicia 14 which assists in preventing counterfeiting. Indeed, the serial number could be hidden behind a ruboff coating, or any other suitable type of authentication, serial numbering or tamper proofing device may be employed in conjunction with the ticket. A ticket also typically includes special symbols or indicia 16 in reserved area 33', which typically indicate the event date and location of the issuance or distribution of the commemorative ticket, e.g. when the collector obtains the ticket or the first showing of the film, etc. In the embodiment shown, the reserved area 33' is the obverse side of the studio logo reserved area 33 on the front face 1 of the ticket 10.

FIG. 3 is an exploded isometric view showing the ticket 10 formed of a single blank of 8 to 10 point cardstock, typically coated one side for high quality four-color offset lithography. The ticket blank is typically 5" wide by 7" long with a longitudinal score or micro perforation 17 along either the top or bottom edge to permit folding of the front panel 18 into aligned contact with an equal sized back panel 19. The film frame or clip packet 20, also called a "sticker", is shown being inserted and adhered to one inner face of one of the two ticket panels, here the inner face 21 of the front panel 18. The inner face 22 of the back panel is shown as having one or more glue strips 23, 23'. It should be noted that the ticket can be made from two separate aligned blanks corresponding to panels 18 and 19. Likewise, the glue 23 may be applied to both inner faces, and may be applied as a full glue coat, strips, or a dot pattern. It is preferred to have a more or less continuous full gluing to ensure integrity of the entire ticket, to strengthen it, and to prevent counterfeiting by removal of the authentic film frame packet, or removal of the film frame from its packet 20, and substituting a counterfeit for it.

It should be understood that-conventional folding, gluing and inserting apparatus may be employed to insert the completed archival film envelope (packet or sticker 20) into the ticket. For example, the packets 20 may be peeled off a carrier backing strip, and blown down or rolled down into place, and then the ticket folded and sealed closed. Such a machine is provided by Label-Aire, Inc., Model 2200, in which the packets are peeled off the carrier strip, held by a vacuum sucker, the sucker placed in position over the window, the vacuum released and the sticker blown down with a puff of compressed air into place on the inside of the ticket.

FIG. 4 is a section view through line 4—4 of FIG. 3. It illustrates in exploded section view the front and back panels 18, 19 and glue 23 applied to at least one of the inner faces 21 or 22 to secure the panels 18, 19 together. In addition, FIG. 4 shows an exploded view of the archival film packet 20 in which the film frame or multiframe clip 4 is laminated between a lower protective poly strip 24 and an upper protective poly strip 25. Adhesive bands 26, 27 are described in more detail below. Adhesive band 26 is also visible in FIG. 3 and adheres the completed packet to the inner face 21 of the front panel 18.

Turning now to FIG. 5, this illustrates the structure and assembly of the archival film packets of this invention. A carrier ribbon 27, which is typically a standard carrier 42–50 lb. litho or kraft paper with the side facing the viewer being silicone treated for pressure sensitive glue release, is provided. The carrier strip can be wider than the packet, as shown by the width marked A, typically 2⅛" to 2⅜", or just as wide as the protective poly film which is shown by the width B, which ranges from about 1⅞" wide to 2" wide. Next, a first lower poly strip film 28 is coated on its backside 29 with spaced marginal glue strips 26. This glue 26 is shown in the facing side of the packet in FIG. 3. This glue is typically a pressure sensitive, non-yellowing, pH neutral, clear, aqueous acrylic emulsion adhesive which permits release of the completed packets from the carrier strip 27.

Then the two marginal bands of a clear pressure sensitive adhesive 31, 31' are coated on the facing or inside of the lower poly strip 28. This can be the same glue as glue 26. It is preferred that these strips 30, 31 extend inwardly from the outer marginal edges 32, 32' of the lower poly strip 28 to the outside edge of the sprocket holes 5, 5' as shown by the arrow D, but it should be understood that they can extend to the inner edge of the sprocket hole track as shown by the arrow C.

Then, the film footage is unspooled, carefully aligned and laid down so that it is adhered to the inner face of the lower poly strip 28. The adhesion is supplied by the approximately 1/16" contact between the outer margin 34 of the film strip 4 and the outer margin 35 of the sprocket holes track 5. As noted, the glue may extend to the inner edge of the sprocket holes track 5 to provide additional adhesive contact.

Then, a second, upper poly strip is laid down over the film clip, and is aligned carefully with the outer marginal edges 32, 32' of the lower poly strip. Appropriate roller pressure is provided to securely bond the two poly strips together by the pressure sensitive adhesive thereby laminating the film clip 4 between the two poly strips.

It should be understood that a wide selection of conventional films and glues may be employed. Typically, a protective poly film should be a non-yellowing UV-resistant polyester film with a thickness which could range from about 0.5 to about 10 mils in thickness, more preferably, 5 to 3 mils, and most preferred in the range of from about 1–2 mills. The film thickness may be selected to reflect the projected useage and rarity of the film clip being archived in the packet, with heaver film selected for the more rare or more extensive use. Polyester film of 1 mil thickness is typical. The preferred glue is a clear water-based acrylic emulsion glue that is pattern coated with rollers in the strips as described above. Regarding the dimensions, the actual movie film strip is on the order of 1¼" to 1⅜" wide, with a 1/16" continuous film band between the outer margin 35 and the outer edge of the sprocket holes, which themselves are typically ⅛" square with 1/32" spacing therebetween. Spaced inwardly from one of the sprocket holes is a ⅛" sound track. The image width is approximately ⅞" to 1⅛" and the height is on the order of ¾". Thus, the typical ticket window will be on the order of ¾" by 1¼" or slightly less to frame the image. FIG. 5 also identifies the successive frames 37 through 44.

Turning now to FIG. 6, this illustrates an example of individual film packets 20A through 20D mounted onto the carrier strip 27 which in this case is the same width as the film packet. In this example, the film packets have been transversely die cut (kiss cut), while on the carrier strip, in a standard label matrix layout. The ⅛" webs 45a–45e between the successive film packets 20A through 20E is removed. Note that the film packet 20A includes the lower half of frame 37, full frame 38, and the upper half of frame 39. Of course, due to the ⅛" die cut, the half frames 37 and 39 may be slightly less than a full half frame. Similarly, the packet 20B contains the full frame 40 flanked by upper and lower half frames 39 and 41 respectively, and so on, for the packets 20C and 20D.

It is presently preferred to employ the additional half frame above and below the frame displayed in the window to permit registration adjustment during the insertion of the packet 20 into the ticket as shown in FIG. 3. However, in the case of extremely rare film footage, more precise cutting and a slightly smaller window, in vertical dimension may be employed. The transverse die cutting may be butt cutting, rather than kiss cutting, with web removed. The cuts are precisely aligned with the upper and lower edges 46, 47 of the respective individual frames 38, 40, 42, 44. Thus, instead of every other frame being utilized, every frame can be preserved and displayed in the ticket of this invention. In this embodiment, each frame can have a leading and trailing edge of poly strip 28, 36.

As seen in FIG. 1, the dashed outline 40a defines the outline of the film packet 20 as secured internally between the front and back panels of the ticket 10. Typically, a full length motion picture comprises one or more 2,000 foot reels of 14½" diameter with approximately 24,000 frames per reel thus providing 12,000 stickers where the two frames per sticker are employed. However, typically from 1 to 3½ frames may be employed in the tickets of this invention. It may be desired to have more than one frame, each of a different scene in one or more windows, or it may be desired to have a multiple adjacent frames in a single window.

As shown above by way of the presently-preferred embodiment, the archival film packet is sealed in the side edges parallel to the sprocket holes of the film footage. It should also be understood that either at the same time or subsequent to the transverse die cutting, the top and bottom edges of the packet may be sealed. In the embodiment shown, the glue strips 23 and 23' on an inner face of the ticket (FIG. 1) serve to seal the top and bottom edges 48, 49 respectively of the individual packets 20. As noted above, it is preferred that all the materials be of high or archival quality, particularly in the cases of extremely rare film footage. In one important embodiment, since some of the film footage is of the old nitrate type, antioxidants or flame inhibiting compounds may be included in the glue or in the hidden portions of the archival film packet.

Figure 8:
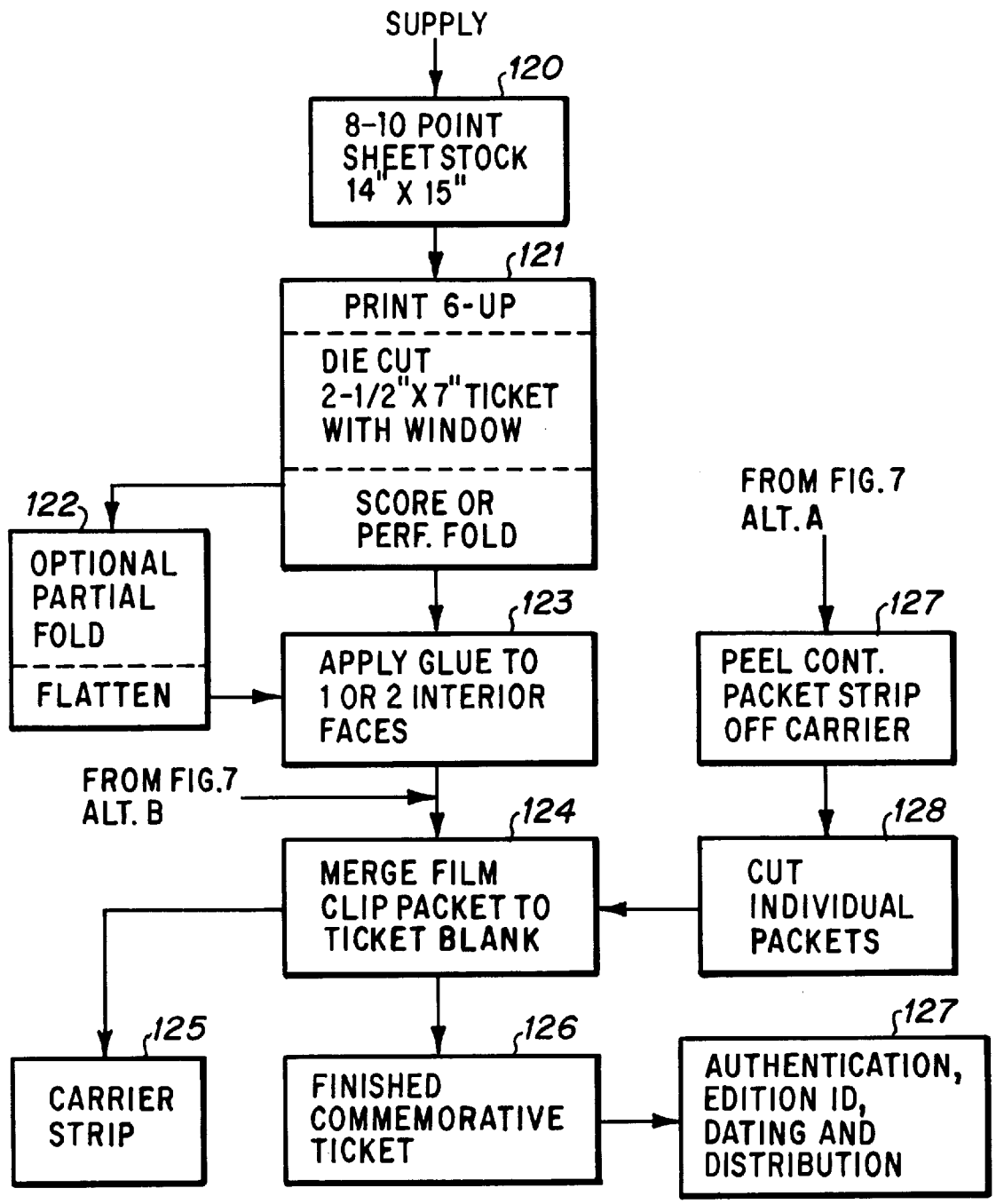
FIG. 8 is a schematic flow sheet of the process of merging and mounting the film packet to the ticket blank and subsequent authentication and distribution.

Turning now to FIGS. 7 and 8, these show processes of production of the archival film frame and film clip packets of this invention, and their insertion in (merging with) the ticket blanks. A number of alternatives are shown, but by applying the principles of this invention a number of equivalent alternatives will be evident and are included within the scope of this invention. Typically, a continuous carrier strip such as 42–50 lb. litho or kraft paper, siliconized on one side, is supplied at 100, and the lower protective poly strip supplied at 101 is releasably secured to it as shown. Either the marginal glue bands can be applied to the carrier strip at 102, or, preferably, the glue is applied to the back of the lower poly strip 103 in the edgeband pattern 26 (FIGS. 4 and 5). These glue strips 26 secure the packet to the ticket. Thereafter, marginal glue bands 31 (FIG. 5) are applied to the face of the lower poly strip at 104. Then the film footage in reel form 105 is unspooled and applied by roller application to the lower poly strip at 106.

Thereafter, the upper poly strip 36 is applied at 107, and the transverse die cut is carried out at 108 as described above. The transverse cut can be a spaced kiss cut with the intervening web removed, or it can be butt cut. FIG. 7 also shows a number of alternate routes for merging of the multiple layers of the laminate. Instead of starting with the carrier strip, the lower poly strip can act as a temporary carrier for the film footage. The film is laminated between the two poly strips, and then applied last to carrier strip at 109. Where the glue is applied to the back of the lower strip, then the application of the glue band to the carrier strip 102 is bypassed as shown by the line 111. At this stage, where the stickers have not already been transversely cut, we proceed to FIG. 8 via Alternative A in FIG. 7. Where the stickers are in label matrix on the carrier strip (preferred), then we proceed via Alternate B to FIG. 8.

FIG. 8 shows schematically the printing of the ticket stock and the merging of the archival film clip packet to form the completed ticket for distribution. As noted, the ticket stock is supplied at 120. By way of an example of this invention, 8–10 point high quality coated glossy stock is employed for six-up sheet stock printing. It should be understood that much larger sheet feed stock or web press stock and printing can be employed. In the example of this invention, the 14" by 15" sheet is printed three across (the 15" width) by two in tandem (the 14" length) in six-up format 121. Thereafter or simultaneously, the ticket stock is die cut into 2½" by 7" individual tickets having the window(s) as described above. Preferably, the longitudinal center fold, score, or perf is made at this stage. These may be carried out in a one pass or a multiple pass operation as shown by the dashed lines within box 121. Optionally, the ticket blank may be partially folded along the score or perf line at 122. Where the packet insertion machinery requires, the individual ticket blanks can then be flattened and glue applied to one or more of the interior faces 21, 22 of the ticket at 123. At this point, the film clip packet Alternative B from FIG. 7 is merged with the ticket blank at 124, the carrier strip peeled off at 125 and the finished commemorative ticket is produced at 126.

In the alternative, where the individual packets have not yet been transversely severed, and coming from Alternative A in FIG. 7, the continuous archival laminate in uncut strip form may be peeled off the carrier at 127, transversely die cut into individual packets at 128 and merged as above described 124, 125 and 126. Optional (but preferred) authentication, edition identification, and the dating and distribution steps which follow, are depicted at 127. However, it should be understood that the individual blanks can be serial numbered at the printing stage 121. The individual date stamping and location stamps may be applied at the theater or at the event by special time and date stampers, much in the manner of commemorative first date covers in the philatelic field.

Turning now to FIG. 9, this shows in isometric view a multipage album 130, here a ring binder by way of example but not by way of limitation. A number of alternate embodiments for the pages 129 are shown. In a principal embodiment, a transportable archival sleeve 131 of heavy gauge plastic, such as Mylar® brand polyester is provided. This is oversized with respect to the ticket 10 which is shown contained within the sleeve. The ticket 10 is inserted via the top opening 132 between the front sheet 133 and the back sheet 134 of the clear plastic archival carrier 131. This permits handling of the ticket without finger oils damaging the high quality printing on the ticket itself. In turn, the transportable protective sleeves 131 may be slipped within oversized pockets 135, of which there may be several per page. As noted by arrow 136, the entire packet 131 is inserted in the page pocket 135 via the opening 136. In the alternative, the page 129 of the album may be made of paper or heavy plastic and have two to four corner slits 137, into which the corners of the transportable packet 131 is inserted. In still another embodiment, retaining corners 138 may be provided on the page. The upper two embodiments on the left page of the album are more clearly illustrated by the lower portion of FIG. 9. Note the extension 139 of the transportable plastic sleeve 131 contains a plurality of holes 140, 140' which permits the sleeve to be retained directly in the rings 141 of the binder 130.

In the embodiment shown on the right hand page 129 of the binder 130, the pocket for the commemorative ticket 10 of this invention is an end-opening type for insertion therein of the ticket as shown by the arrow 142. Arrow 143 shows the insertion from the top as compared to the end insertion 142. Identifying indicia 144, for example, that the tickets are part of a series from the same film or event, can assist the orderly collection of the full suite of the commemorative tickets pertaining thereto.

Accordingly, the ticket album and carrier sleeve provides a complete system for archival collection and identification of commemorative frames or multiframe clips of films, events, performances, historical, scientific matters and the like.

FIG. 10 illustrates another embodiment of the film packet of this invention which is particularly useful for the jewelcase type easel display frames described above in the Background. In this embodiment, a film strip of three frames plus a top ½ frame and a bottom ½ frame, a total of 4 frames, is die cut from a continuous reel footage and applied to the lower poly strip as before. However, in this instance, the lower poly strip has a matte finish instead of glossy finish. Either one or both sides may have a matte finish to provide a light diffusing background for the image, which is more suitable for the easel type rigid plastic jewelcase mounting display. While a dual poly strip packet may be employed, instead of a single full-width upper poly strip, two narrow marginal side strips 150, 151 are applied coordinate with the outer margin 46 and 47 of the lower poly strip. The inside (back) face of these thin ribbons are also coated with the glue. There is, in this embodiment by way of example, glue to glue bonding along the marginal edge of the lower plastic strip to the two upper marginal strips. That is, the area over the frame(s) of the film clip in this embodiment is (are) not covered by an upper plastic strip. This is because the packet is mounted inside the large, easel-type jewelcase between the 8" by 10" or 5" by 7" sheet(s) of paper or card stock and the additional archival covering is not required. Of course, it should be understood that if desired the same archival packet structure as shown in FIGS. 3–5 may be employed for the jewelcase easel mount embodiment. However, under certain light conditions, the addition of the clear upper poly strip may give rise to interference patterns, e.g. Newton's rings, birefringence, or other chromatic aberrations. This can interfere with satisfactory viewing. The facing side of each of the two marginal poly strips 150, 151 is then coated with the adhesive.

As seen in FIG. 11, packet 20E is applied between the front and back image sheets 155, 156, respectively coordinate with window 154. This display piece is then mounted, typically permanently, within the easel jewelcase 152 and placed in stand base 153. A back light unit 157, powered by battery 158 may be used to enhance viewing, especially in a darkened room or in a curio case. It should be understood that the jewelcase with a display sheet having a window and film clip attached to the back side is available from the Lightpost Group, Inc. of San Jose, Calif. But the improved film clip packet 20E of FIG. 10 (or 20 of FIG. 3) by themselves and in combination in this display assembly, are novel.

In manufacturing the packet embodiment 20E of FIGS. 10 and 11, the two marginal ribbons 150, 151 may be glued, then laid down spaced apart on the backing strip 27, overglued 31, 31', the film 4 unspooled and laid down, and the matte diffusion strip 30 applied thereover. That assembly is the reverse order of what is shown in FIG. 10. In this embodiment, the packet is constructed face side down.

The reference to die cut of the packets from the continuous film footage includes kiss cutting and butt cutting. Kiss cutting with removal of the intermediate web is preferred. In kiss cutting, the cutters are adjusted to cut through film and poly strips already mounted on the carrier paper with a precision typically of 1 to 5 thousandths, typically 3 thousandths. The kiss-cut knives may actually form a slight indentation in the carrier paper, but since it is siliconized on the surface, the paper itself is not cut and the carrier strip web remains integral and strong enough for automated mechanical handling in the remainder of the process operations as described above. Butt cutting is a single cut with no removal of intermediate web of film or plastic strip.

It should be understood that various modifications within the scope of this invention can be made by one of ordinary skill in the art without departing from the spirit thereof. For example, each panel 18, 19 may be made of multi-layer stock, with the inner layer having a larger window, the size of the completed packet 20 (FIG. 3) so the packet is received within a recess in the ticket and no bulges occur around the window. In addition, the ticket may be any desired shape, such as round, square, triangular and of any dimension. An example would be a round shape printed to look like a baseball with a window having a display frame of a famous highlight in a player's career, or a famous game. The two poly sheets need not be the same size; that is, one may overlap beyond the marginal edges of the other, and the glue to adhere the packet to the inner face of a ticket panel may be applied to the marginal overlap. We therefore wish our invention to be defined by the scope of the appended claims as broadly as the prior art will permit, and in view of the specification if need be.

We claim:

1. A combined archive-packaged collectible motion picture film clip and commemorative display ticket device comprising in operative combination:

a) a planar commemorative ticket having a front face surface and a back surface, a first-longitudinal axis, and a second, transverse axis;

b) said ticket being formed of one sheet of material, said sheet includes a central longitudinal fold line dividing said sheet into two equal rectangular panels, a first, front panel, and a second, back panel, each panel having an interior surface and an exterior surface, the exterior surface of the front panel forming the front surface of the ticket, and the exterior surface of the back panel forming the back surface of the ticket;

i) said sheet is folded along said longitudinal fold line;

ii) each of said panels includes a single aperture therethrough so that upon folding of the sheet along the fold line to bring said front panel and said back panel together, said apertures are cooperatively aligned to form a single viewing window through said planar ticket; and iii) said interior surfaces of said front panel and said back panel are secured together to form a unitary ticket;

c) a motion picture film clip including at least one frame mounted in association with said window so that an image on said clip may be viewed by light transmission therethrough, said film clip frame having a first pair of opposed side marginal edges and rows of sprocket holes spaced inwardly from said first pair of marginal edges;

d) said film clip having at least one image area defined between said rows of sprocket holes and a second pair of marginal edges generally orthogonal to said first pair of marginal edges;

e) said film clip being sealed along marginal bands defined by said rows of sprocket holes in an individual archival packet of non-yellowing, thin, flexible transparent plastic;

f) said transparent plastic packet in turn being secured along marginal strips to at least one of the interior surfaces of said front panel and said back panel and aligned with said window so said image area is viewable through said window;

g) at least one of said front and back surfaces of said ticket including printed commemorative indicia relating to said motion picture film frame or clip, said commemorative indicia is selected from information relating to the motion picture to which the image on said film clip pertains, indicia authenticating the motion picture source of said film clip, security indicia, serial number, limited edition number, or combinations thereof; and h) said commemorative ticket, when assembled, forms a collectible display device for retainingly engaging said film clip disposed in said archival packet to protect said film clip against scratching or deterioration with handling while presenting it for display in association with said commemorative indicia related thereto.

2. The combined archive-packaged collectible motion picture film clip and commemorative display ticket device as in claim 1 wherein:

a) said ticket is generally rectangular in shape; and b) at least one row of sprocket holes is visible in said window in the assembled condition, on at least one side of said film clip to assist in authentication of the nature of the film clip.

3. The combined archive-packaged collectible motion picture film clip and commemorative display ticket device as in claim 1 wherein:

a) said panels are rectangular with an aspect ratio of length to width on the order of from about 5:1 to 2:1, and at least some of said printed indicia are disposed on at least one face adjacent one end thereof, said printed indicia identifying at least one of a studio, a location, and/or date of the event commemorated in the film frame or clip visible in said window.

4. A combined archive-packaged collectible motion picture film clip and commemorative display ticket device of claim 1 in combination with a carrier, said carrier comprising in operative combination:

a) a heavy plastic pouch comprising front and back sheets joined adjacent their marginal edges and having at least one marginal edge unsealed to permit insertion therein of said commemorative display ticket device; and b) at least one through-hole associated with one of said sealed marginal edges for permit retentive engagement with a ring member associated with the spine of an album.

* * * * *